Feb. 14, 1967   L. U. RASTRELLI ET AL   3,304,528
ELASTOMERIC STRAIN GAUGE
Filed Sept. 29, 1965
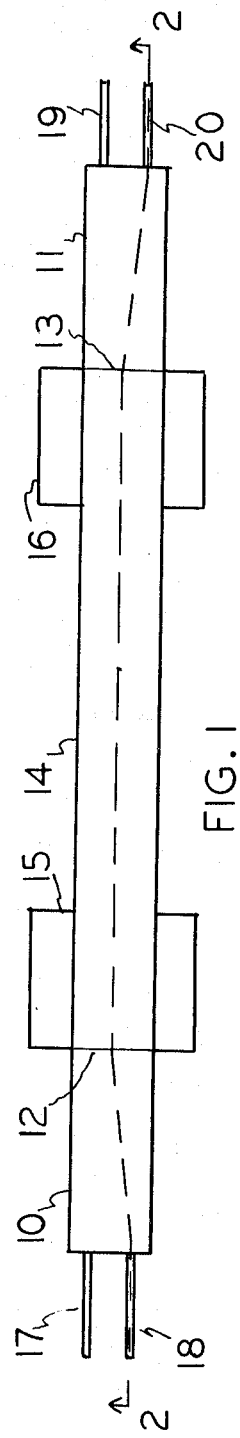
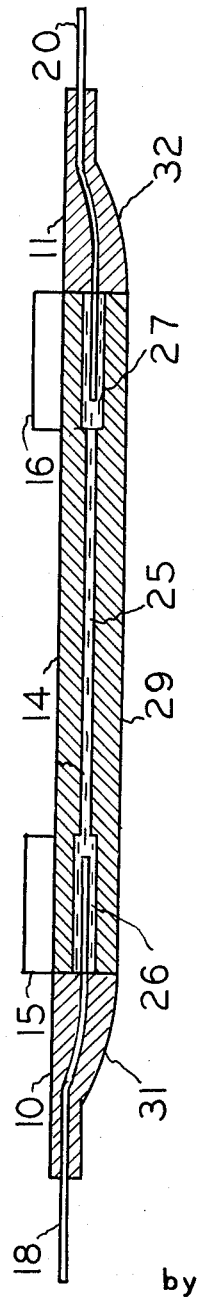
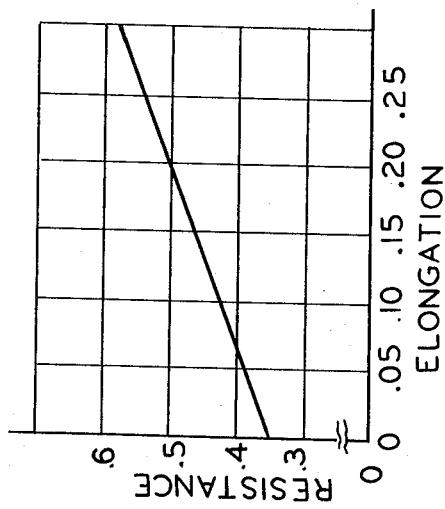
INVENTORS
LEONARD U. RASTRELLI
JARVIS D. MICHIE
EUGENE L. ANDERSON
by
*Richard J. Miller*
ATTORNEY

United States Patent Office 3,304,528
Patented Feb. 14, 1967

3,304,528
ELASTOMERIC STRAIN GAUGE
Leonard U. Rastrelli, Eugene L. Anderson, and Jarvis D. Michie, San Antonio, Tex., assignors, by mesne assignments, to the United States of America as represented by the Secretary of the Navy
Filed Sept. 29, 1965, Ser. No. 491,470
8 Claims. (Cl. 338—2)

This invention relates to an improved strain gauge and more particularly to a device for measuring strain on materials which are subject to errors when the various testing devices are applied thereto.

In the general field of strain gauges, it has been found that although most strain gauges work satisfactorily in certain types of operations there is a testing requirement that the device be measured as free from error induced by the testing device as possible. That is a gauge mounted on a device may tend to reinforce or weaken the test specimen giving erroneous data. The teachings of this invention are aptly designed to accomplish this result.

Therefore, it is an object of this invention to provide an improved strain gauge.

It is a further object of this invention to provide a strain gauge wherein the rectangular body of the gauge is made substantially of the same material as the material to be tested.

It is yet another object of this invention to provide an improved strain gauge wherein a small capillary tube is provided in a material which is deformable at the same rate and has the same characteristics as the device to be tested.

It is still a further object of this invention to provide an improved strain gauge including a deformable housing having therein a passageway having a circular cross-sectional configuration and having two reservoirs coupled to the passageway and having confined therein a liquid with a known specific resistivity whereby deformation of the housing varies the length and cross-sectional area of the passageway to provide a change in total electrical resistance of said passageway.

It is yet another object of this invention to provide an improved strain gauge, comprising: a body member; first and second end members affixed to the body member; a passageway in the body member; first and second reservoirs connected to the passageway in the body member; a liquid having a known resistivity in the passageway and the reservoirs; means, including first and second wires extending through the end member for making electrical contact to the reservoir; and means, including a planar surface on the body member to be bonded to a device to be tested so that the body member elongates with the device.

Other objects, advantages and novel features of the invention will become apparent from the following detailed description of the invention when considered in conjunction with the accompanying drawings wherein:

FIGURE 1 is a top view of one embodiment of the invention;

FIGURE 2 is a sectional view along lines 2—2 in FIGURES 1; and

FIGURE 3 is a graph of elongation versus resistivity.

Referring to the figures it can be seen that the improved strain gauge is composed of first and second end members 10 and 11, joined across the bonding surfaces 12, 13 to a body member 14 having specific chemical and mechanical characteristics. In addition, a pair of calibrating lugs 15, 16 are provided mounted on said housing. In the embodiment as shown in the figures, a first pair of lead wires 17, 18, and a second pair of lead wires 19, 20 are provided for coupling to an external circuit as hereinafter discussed.

The sectional view, FIGURE 2, shows a very small diameter circular aperture or passageway 25 extending between a first reservoir 26 and a second reservoir 27 in the body member 14. Into this reservoir an electrolytic solution 26 is placed which has a specific known resistivity. The wires 17 and 18, and 19 and 20 extend through the end members 10, 11 into the reservoirs 26, 27. When manufacturing the gauge the ends of the wires in the reservoirs are held to a relatively close tolerance as far as dimensioning goes to minimize the problems of calibration of the instrument and to produce gauges of a relatively uniform performance.

The body member 14 is provided with a surface 29 which is utilized to bond the strain gauge to the material to be tested. The end members 10, 11 have curved portions 31, 32 which tend to lift the lead wires away from the material to be tested and further prevent distortion due to loading of the member to be tested.

The formula for determining the resistivity of a given material may be given as follows:

$$R = \rho \frac{L}{A}$$

where

R is the total resistance,
$\rho$ is the specific resistance of the material,
L is the length of the material,
A is the cross-sectional area of the material.

It can be seen from the formula that when the specific resistivity of the material is known then the over-all resistance is directly portional to the length of the member to be calibrated and inversely portional to the cross-sectional area. In operation the strain gauge, body member 14, elongates under tensile strain, and the length (L) increases and the cross-sectional area (A) decreases in the small passageway 25 and with the construction as shown there is a linear relationship to the change of resistance as shown in FIGURE 3. As can be seen, the elongation increases the resistance as measured between the wires 17, 18, and 19, 20 increases.

The embodiment of the invention as shown is particularly adapted for utilization with the Kelvin bridge, however, without modification it might also be utilized with the Wheatstone bridge.

Calibration of the gauge is somewhat critical and therefore calibrating lugs 15, 16 have been provided for gripping the device and causing it to elongate without disturbing the over-all instrument itself. Upon completion of calibration these lugs may be removed if desired for the purpose of mounting to the body to be tested.

It has been found that during the calibration it is advisable to cycle the device through four or five operations of elongation and relaxation to insure a permanency. One successful embodiment of the invention utilized a polyurethane body member and the body portion 14 was some 0.5 inch long. The material inside was a mercury base alloy.

The diameters of the two reservoirs are substantially equal as are the lengths with a resulting volume within the reservoirs equal to about ten times the volume with the passageway 25. Thus, there is provided the proper volume within the reservoirs to allow for changing volumetric conditions within the passageway under tension and relaxation. Furthermore, it should be noted lugs 15, 16 are positioned upon body member 14 so that during calibration the body member is extended uniformly with respect to the passageway.

Obviously many modifications and variations of the present invention are possible in the light of the above teachings. It is, therefore, to be understood that within the scope of the appended claims the invention may be practiced otherwise than as specifically described.

We claim:
1. An improved strain gauge, comprising:
    (a) an elastomeric body member;
    (b) first and second end members of elastomeric material affixed to said body member;
    (c) a passageway having first and second ends in said body member;
    (d) first and second reservoirs connected to said first and second ends of said passageway respectively in said body member;
    (e) a liquid having a known electrical resistivity in said passageway and said reservoirs;
    (f) means, including first and second wires extending through said end members for making electrical contact to said liquid of known resistivity in said reservoirs; and
    (g) means, including a planar surface on said body member to be bonded to a device to be tested so that the body member elongates with said device.
2. An improved strain gauge, comprising:
    (a) an elastomeric body member having a longitudinal axis;
    (b) first and second end members of elastomeric material affixed to said body member;
    (c) a passageway having first and second ends extending along said axis in said body member;
    (d) first and second reservoirs connected to said first and second ends of said passageway respectively in said body member and positioned along said axis;
    (e) a liquid having a known electrical resistivity in said passageway and said reservoirs;
    (f) means, including first and second wires extending through said end members for making electrical contact to said liquid of known resistivity in said reservoirs; and
    (g) means, including at least one planar surface on said body member to be bonded to a device to be tested so that the body member deforms with said device.
3. An improved strain gauge, comprising:
    (a) a polyurethane body member having a longitudinal axis;
    (b) first and second polyurethane end members affixed to said body member;
    (c) a passageway having first and second ends extending along said axis and having a circular cross-sectional configuration in said body member;
    (d) first and second reservoirs connected to said first and second ends of said passageway respectively in said body member having circular cross-sectional configurations and being positioned along said axis;
    (e) a liquid having a known electrical resistivity in said passageway and said reservoirs;
    (f) means, including first and second wires extending through said end members for making electrical contact to said liquid of known resistivity in said reservoirs; and
    (g) means, including at least one planar surface on said body member to be bonded to a device to be tested so that the body member elongates with said device.

4. The gauge of claim 3 wherein the volume of said reservoirs is at least ten times the volume of said passageway.

5. An improved strain gauge for measuring variations in mechanical strains in a device to be tested comprising:
    (a) an elastomeric body member having at least one planar surface for affixing said body to said device to be tested;
    (b) a passageway formed in said body member and extending therethrough, said passageway having first, second, and third portions, said first and third portions positioned at the ends of said body member and having substantially equal lengths and cross-sectional areas, said second portion connecting said first and third portions and having a cross-sectional area of less than one-tenth of that of said first and third portions;
    (c) first and second elastomeric end members joined to said body member and positioned to seal off said first and third portions of said passageway;
    (d) first and second wires extending through said first and second end members into said first and third portions of said passageway; and
    (e) a liquid having a known electrical resistivity filling said first and second, and third portions of said passageway, said liquid being in electrical contact with first and second wires.

6. The gauge of claim 5 wherein portions of said first and second end members are curved away from said planar surface so that they do not contact the device to be tested.

7. The gauge of claim 6 wherein there are provided first and second calibration lugs affixed to said body member adjacent to said first and third portions of said passageway.

8. The gauge of claim 7 wherein said passageway extends along an axis substantially parallel to said planar surface.

References Cited by the Examiner

UNITED STATES PATENTS

| | | | |
|---|---|---|---|
| 2,061,863 | 11/1936 | Wells | 73—143 |
| 2,359,085 | 9/1944 | Chubb | 338—84 |
| 2,517,553 | 8/1950 | Fowler | 338—114 X |
| 2,518,906 | 8/1950 | Kocmich | 338—114 |
| 2,566,369 | 9/1951 | Putman | 338—83 X |
| 2,711,447 | 6/1955 | Schultz et al. | 338—114 |
| 2,735,949 | 2/1956 | Podolsky | 128—2.06 |
| 2,739,212 | 3/1956 | Woolley et al. | 338—2 |
| 2,792,565 | 5/1957 | Popowsky | 338—86 X |
| 2,837,082 | 6/1958 | Elliott et al. | 128—2.06 |
| 3,031,634 | 4/1962 | Vogt | 338—2 |
| 3,103,821 | 9/1963 | Wright | 338—86 X |
| 3,153,929 | 10/1964 | Baldwin | 73—103 |

FOREIGN PATENTS 284,770  2/1929  Great Britain.

RICHARD M. WOOD, *Primary Examiner.*

ANTHONY BARTIS, *Examiner.*

W. D. BROOKS, *Assistant Examiner.*